US006973658B2

(12) United States Patent
Nguyen

(10) Patent No.: US 6,973,658 B2
(45) Date of Patent: Dec. 6, 2005

(54) RECONFIGURABLE COMMUNICATION INTERFACE AND METHOD THEREFOR

(75) Inventor: Michael Anh Nguyen, Singapore (SG)

(73) Assignee: Serial System Ltd., Singapore (SG)

( * ) Notice: Subject to any disclaimer, the term of this patent is extended or adjusted under 35 U.S.C. 154(b) by 688 days.

(21) Appl. No.: 09/934,618

(22) Filed: Aug. 22, 2001

(65) Prior Publication Data

US 2002/0029303 A1    Mar. 7, 2002

(51) Int. Cl.[7] .............................................. G06F 9/44

(52) U.S. Cl. ..................... 719/327; 710/62; 710/63; 710/72; 710/104; 713/1; 713/100

(58) Field of Search ............... 719/321–327; 710/1–14, 710/62–74, 104; 709/200–203, 217–219, 709/230–232; 379/93.07; 369/112.23; 713/2, 713/1, 100

(56) References Cited

U.S. PATENT DOCUMENTS

| | | | | |
|---|---|---|---|---|
| 5,649,001 A | * | 7/1997 | Thomas et al. | 379/93.07 |
| 5,918,068 A | | 6/1999 | Shafe' | |
| 5,999,990 A | * | 12/1999 | Sharrit et al. | 710/8 |
| 6,539,438 B1 | * | 3/2003 | Ledzius et al. | 710/8 |
| 6,633,531 B1 | * | 10/2003 | Hirono et al. | 369/112.23 |

* cited by examiner

Primary Examiner—St. John Courtenay, III
(74) Attorney, Agent, or Firm—Merchant & Gould P.C.

(57) ABSTRACT

When an external device (not shown) is connected to a matching connector of a variety of connectors (235–260), a microcontroller 205 detects the matching connector (235–260) and the external device, then accesses a memory (210) to get an appropriate connector core, device driver and an application, in accordance with the detected requirements of the external device. The microcontroller (205) uses the connector core, device driver and application to configure a programmable logic device (PLD) 230 to support communication with the external device through the matching connector (235–260).

33 Claims, 5 Drawing Sheets

RECONFIGURABLE COMMUNICATION INTERFACE AND METHOD THEREFOR

FIELD OF THE INVENTION

The present invention relates to a reconfigurable communication interface and more particularly to an interface having a variety of connectors for operably coupling to a variety of devices.

BACKGROUND OF THE INVENTION

Presently, information such as data files, audio and video recordings are stored in a variety of storage devices and each of these storage devices are typically accessed through different physical connectors and also require different software programs, such as drivers and applications, in order to communicate data. In addition, with the advent of the Internet and distributed computing, such storage devices may be located in a variety of different locations and linked via communication links. Consequently, managing the variety of information stored in the variety of storage devices can become difficult.

With the intent of consolidating information storage, one approach has been a Storage Area Network (SAN). The SAN is a network based mass data storage solution, which provides storage of information in a virtual single storage device. When working on a computer coupled to the SAN through the Internet, for example, the SAN appears to a user as just another storage unit, or drive, along with other storage units, such as a hard disk and floppy disk drives in the computer. The SAN provides a viable solution for corporate information.

Digital technologies have made a substantial amount of personal information available in digital form. Such information includes documents and data files in computers at home and at work, and can include pictures, and audio and video recordings. In addition, the audio and video recordings can include pre-recorded commercial music and movies, perhaps purchased over the Internet, or recordings which are made with personal recording equipment. Hence, it would be convenient to be able to store all personal information, including data, audio and video information in a media, which is conveniently accessible.

The SAN is one solution, however, using the SAN for storing personal information raises several concerns. One concern is the risk that privacy will be compromised as the SAN is typically operated by a service provider, which may not be located in the same country as a user. Another concern is the difficulty with access over the Internet as access is not readily and conveniently available in many parts of the world, and even varies in different parts of a country. Yet another concern is the speed of communication via the Internet given the growing demands on bandwidth in view of the growth in users and services.

U.S. Pat. No. 5,918,068 by Shafe' and assigned to International Business Machines Corp. (IBM) of USA, teaches a portable reconfigurable storage device in a PCMCIA form factor. The storage device has a hard disk drive integrated therein and a connector for connecting to a computer, or a computer network, having a matching connector. It is user-configurable and can be configured to communicate using one of several communication protocols to store and retrieve information from the hard disk drive. In this way, personal information can be transferred from a first computer to the storage device, and the storage device can then be transported to another computer, connected thereto, and the stored information communicated to the second computer. Of course, when connecting the storage device to either of the two computers, a user must ensure that the computers have a physical connector that matches the one on the storage device. In addition, as the computers may not share a common communication protocol, the user must also select an appropriate communication protocol for each computer. Often times, a software application and/or driver will have to be loaded into at least one of the computers.

Shafe' provides a portable storage device for storing personal information that alleviates some of the limitations of the SAN solution, however, personal information may be stored in a variety of devices, not just in computers or communication networks. Such devices include audio and video recording equipment, which themselves have a variety of data storage media ranging from solid state memory chips to magnetic media, and each of this variety of devices have one or two of a variety of connectors through which information can be communicated using one of a variety of communication protocols.

In addition, Shafe' does not provide for information to be communicated to and/or from other sources other than the hard disk drive. Shafe' also requires that a user knows which communication protocol is required to select the appropriate one when connecting to a local area network (LAN), for example. This may be difficult for a visitor to a facility who does not know which communication protocol is being utilized on the LAN needs to connect and communicate on the LAN.

BRIEF SUMMARY OF THE INVENTION

The present invention seeks to provide a reconfigurable communication interface and a method therefor, which overcomes, or at least reduces the abovementioned problems of the prior art.

Accordingly, in one aspect, the present invention provides an electronic apparatus for operably coupling to at least a first device of a variety of devices having at least one connector thereon, the apparatus comprising:

a variety of connectors, wherein the variety of connectors include a first connector that connects to the at least one connector;

a programmable coupler having an input for receiving coupling instructions and having communication ports coupled to the variety of connectors, wherein at least one of the communication ports is coupled to the first connector, the programmable coupler for coupling the at least one communication port in accordance with the coupling instructions;

a controller coupled to the programmable coupler, the controller for determining that the first device is connected to the first connector, and for providing the coupling instructions, the controller for accessing a first device driver of a variety of device drivers, and accessing a first connector core of a variety of connector cores, and the controller being coupled to provide the first device driver and the first connector core; and a programmable logic unit coupled to the controller and the programmable coupler, and the programmable logic unit having a variety of logic resources, the programmable logic unit for receiving the first device driver and the first connector core, for configuring at least some of the variety of logic resources in accordance with the first connector core to provide a first connector processor and first device driver and the, and for configuring the first device driver to operate with the connector processor, wherein the first device driver and the first connector processor establish communication with the first device via the programmable coupler.

In another aspect, the present invention provides an electronic apparatus for operably coupling to at least a first device of a variety of devices having at least one connector thereon, the apparatus comprising:

a variety of connectors, wherein the variety of connectors include a first connector that physically connects to the at least one connector;

a first memory having a device driver portion for storing a variety of device drivers and having a connector core portion for storing a variety of connector cores;

a programmable logic device having communication ports coupled to the variety of connectors; and a controller coupled to the first memory and the programmable logic device, the controller for communicating with the programmable logic device to determine the first device is connected to the first connector, and the controller for providing at least a first device driver of the variety of device drivers and at least a first connector core of the variety of connector cores from the first memory to the programmable logic device, wherein the programmable logic device configures a corresponding connector processor therein and configures a corresponding device driver to operate with the connector processor, and wherein the corresponding device driver and the corresponding connector processor establish communication with the first device through the first connector.

In yet another aspect, the present invention provides a method in a reconfigurable communication interface for operably coupling to a first device of a variety of devices, the first device having at least one connector thereon, the method comprising the steps of:

a) providing the reconfigurable communication interface comprising:
   a variety of connectors, wherein the variety of connectors include a first connector that connects to the at least one connector;
   a programmable logic device having a plurality of communication ports coupled to the variety of connectors; and
   a controller coupled to the programmable logic device;
b) detecting the first device is physically connected to the first connector;
c) accessing a first connector core of a variety of connector cores associated with the first connector;
d) configuring a first connector processor in the programmable logic device;
e) accessing a first device driver of a variety of device drivers associated with the first device;
f) configuring the first device to operate with the first connector processor in the programmable logic device; and establishing communication with the first device through the first connector using the first connector processor and the first device driver.

BRIEF DESCRIPTION OF THE DRAWINGS

An embodiment of the present invention will now be fully described, by way of example, with reference to the drawings of which.

DETAIL DESCRIPTION OF THE DRAWINGS

The present invention, as will be described below, is a reconfigurable communication interface, which provides the necessary mechanism for universal data access between a variety of devices having a variety of physical connectors that support a variety of communication protocols. When connected to an external device through a particular connector, the reconfigurable communication interface identifies the particular connector and the external device, and then configures itself to communicate with the external device through the particular connector. When the reconfigurable communication interface is later connected to another external device through another connector, the reconfigurable communication interface reconfigures itself, such that it can now communicate with the other external device through the other connector Two or more external devices can be connected to the reconfigurable communication interface. In such applications, the reconfigurable communication interface acts as a bridge or hub between the external devices.

Figure 1:
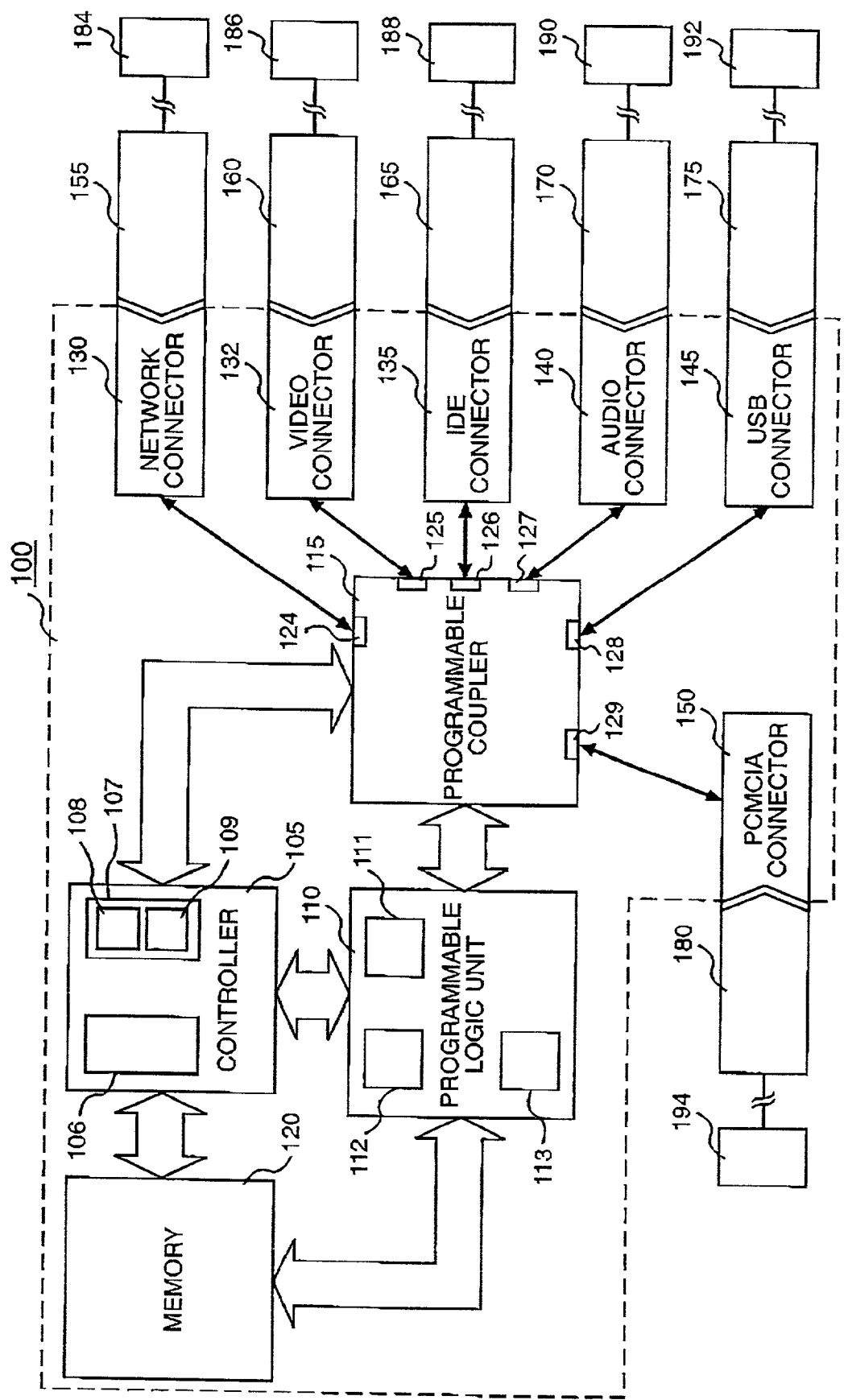
FIG. 1 shows a functional block diagram of a reconfigurable communication interface in accordance with the present invention.

In FIG. 1, a reconfigurable communication interface (RCI) 100 comprises a controller 105, a programmable logic unit 110, a programmable coupler 115, a memory 120 and a variety of connectors 130–150. For illustrative purposes, a corresponding variety of matching connectors 155–180 are detachably connected to the variety of connectors 130–150, and each of the matching connectors 155–180 are coupled to one of a variety of external devices 184–194.

The controller 105 includes one or more processors 106, an internal memory 107 and a communication bus for communicating with components external to the controller 105. The internal memory 107 includes a main program 108 that performs some of the functions of what may be described as an operating system for the RCI100, and can also include software, often referred to as firmware, called connector cores, device drivers and applications 109.

A connector core is a software program for configuring a connector processor in the RCI 100 that supports a communication protocol for a particular type of physical connector. Therefore, the variety of connector cores stored in the memory 107 should at least configure connector processors that support a variety of communication protocols for the variety of connectors 130–150. Examples of connector cores are USB host, USB slave, PCMCIA, IDE, PCI, Ethernet, Firewire, Serial, etc. A connector processor supports hardware configuration and communication through a particular connector.

A device driver is a software program that, when loaded and executed in the RCI 100, supports communication with a particular external device through a particular configured connector processor. In addition, a pair comprising a particular device driver program and a particular connector core program are required to support communication with a particular external device through a particular connector. So, when an external device has two connectors, say a parallel and a serial connector, a first pair of device driver and connector core programs are required to support the parallel connection, and a second pair of device driver and connector core programs are required to support the serial connection. Hence, the variety of device drivers stored in the memory 107 should at least include device drivers that support a range of external devices, and connector cores that configure a range of connector processors, to enable communication with the external devices to which a user of the RCI 100 regularly connects. The connector core and device drivers can be modified, updated and replaced to suit the requirements of a user of the RCI 100.

Typically, a connector processor is configured and a device driver is loaded in the RCI 100 to support communication with a particular external device connected to a particular connector i.e. one of 130–150. More than one pair of device driver and connector core may be loaded and configured, respectively, in the RCI 100 at a time, depending on available resources in the RCI 100. A device driver is a higher-level program that operates with a connector core. In some instances an application program, a higher-level program than the device driver, operates with a device driver and a connector processor. In such circumstances, the device driver performs a role akin to that of a translator between the application program and the connector processor.

An application is a software program that operates in conjunction with previously loaded device driver(s) and previously configured connector processor(s), to support services provided or required by an external device. Not all external devices require applications, and where air external device indicates a need for particular applications, those applications will be provided by the RCI 100. For example, to support interface between the RCI 100 and a computer network operating a particular network protocol a PCMCIA network card can be used with the RCI 100. Here, the RCI 100 determines the required connector core, device driver and application(s), if any are required. The RCI 100 then configures and executes a PCMCIA connector processor, loads a network LAN device driver for the network functionality, and an application program for the particular data synchronization on the LAN network, to establish communication and to exchange services between the RCI 100 and the computer network.

The controller 105 is coupled to the memory 120 which may contain software including portions of the operating system, some device drivers, connector cores and applications. It will be understood by one skilled in the art, the reference to software herein, except where specifically provided otherwise, refers to micro-code. The internal memory 107 and the memory 120 may also be shared to provide storage for the connector cores, device drivers and applications, with the controller 105 managing such sharing. The main program 108 determines the primary operation of the RCI100, when executed by the controller 105. The memory 120 can be used as the working memory for the controller 105, where all required programs are loaded for execution.

The programmable logic unit 110 comprises a variety of reconfigurable processing resources 111, including logic resources, and includes a communication bus for communicating with the controller 105, the programmable coupler 115, and the memory 120. The controller 105 can program the programmable logic unit 110 to configure and initiate device drivers, and to configure and initiate connector processors to support communication with one or more external devices. The controller 105 programs the programmable logic unit 110 with a connector core and a device driver to configure a corresponding connector processor and the device driver in the programmable logic unit 110.

When a particular application is required by one of the external devices 184–194, the corresponding pair of device driver and connector processor will operate with that application, after the application is loaded into the memory 120 and executed by the controller 105. As mentioned earlier, two or more pairs of device driver and connector processor may be configured in the programmable logic unit 110 at a time, however, the limitation on the number of device drivers and connector processors that can be configured in the programmable logic unit 110, and operated concurrently, will depend largely on the speed and quantity of the reconfigurable processing resources 111 that are available therein; and also on the particular external devices that are connected to the RCI 100.

While the programmable logic unit 110 may have the necessary processing resources to perform the function of one or more and connector processors, independent of the controller 105, it is also envisaged that the controller 105 may provide some processing resources to support the operation of one or more connector processors configured in the programmable logic unit 110. The programmable logic unit 110, may itself have an internal processor 112 and memory 113 to support the reconfiguring and running of the one or more pairs of device and connector processors. In addition, the programmable logic unit 110 can be programmed to support detection when an external device is connected to any one of the connectors 130–150. For example, by detecting when a signal from an external device is received at any of the variety of connectors 130–150.

The programmable coupler 115 has a number of communication ports 124–129, to which the connectors 130–150 are coupled. The programmable coupler 115 comprises a programmable switching matrix, which can be programmed with coupling instructions to interconnect the communication ports 124–129, the programmable logic unit 110 and the controller 105. The programmable coupler 115 also has a communication bus for communicating with the controller 105 and the programmable logic unit 110. The programmable coupler 115 can, for example, be programmed with coupling instructions from the controller 105 to connect the controller 105 to any of the connectors 130–150, and indeed even to connect two or more of the connectors 130–150 to each other. Typically, the controller 105 programs the programmable coupler 115 with coupling instructions to make connections between the programmable logic unit 110 and the communication ports 124–129. In addition, one of the external devices 184–194 can be connected to one of the connectors 130–150 to program the programmable coupler 115 under the control of the controller 105.

The programmable coupler 115 can be a simple switch array or be as complex as the programmable logic unit 110 having its own internal processor and memory resources. When used to connect one of the connectors 130–150 to the controller 105, the programmable coupler 115 allows software in the controller's 105 internal memory 107 to be updated or changed from an external source.

The memory 120 comprises any data storage component including solid state and magnetic disk drives. When a solid state or magnetic disk drive is used, the RCI 100 can be used as a portable personal storage media that can advantageously be used to store and exchange information between a variety of external devices having a variety of connectors with a variety of communication protocols. Alternatively, an external disk drive (not shown) can be coupled to any of the connectors 130–150, and the hard disk drive can then be used as the memory 120.

The connectors 130–150 comprise a range of physical connectors such as, an RJ45 network connector 130, a digital video connector 132, an integrated drive electronics connector (IDE) 135, a digital audio connector 140, a universal serial bus master connector (USB-Master) and/or a universal serial bus slave (USB-Slave) connector, a PCM-CIA connector. Other connectors that can be included are an RJ11 telephone connector, an infra-red IRDA transceiver, a small computer serial interface (SCSI) connector, an IEEE-1394 or Firewire connector, a parallel interface connector, a peripheral component interconnect (PCI) connector, and virtually any other type of connector.

Figure 2:
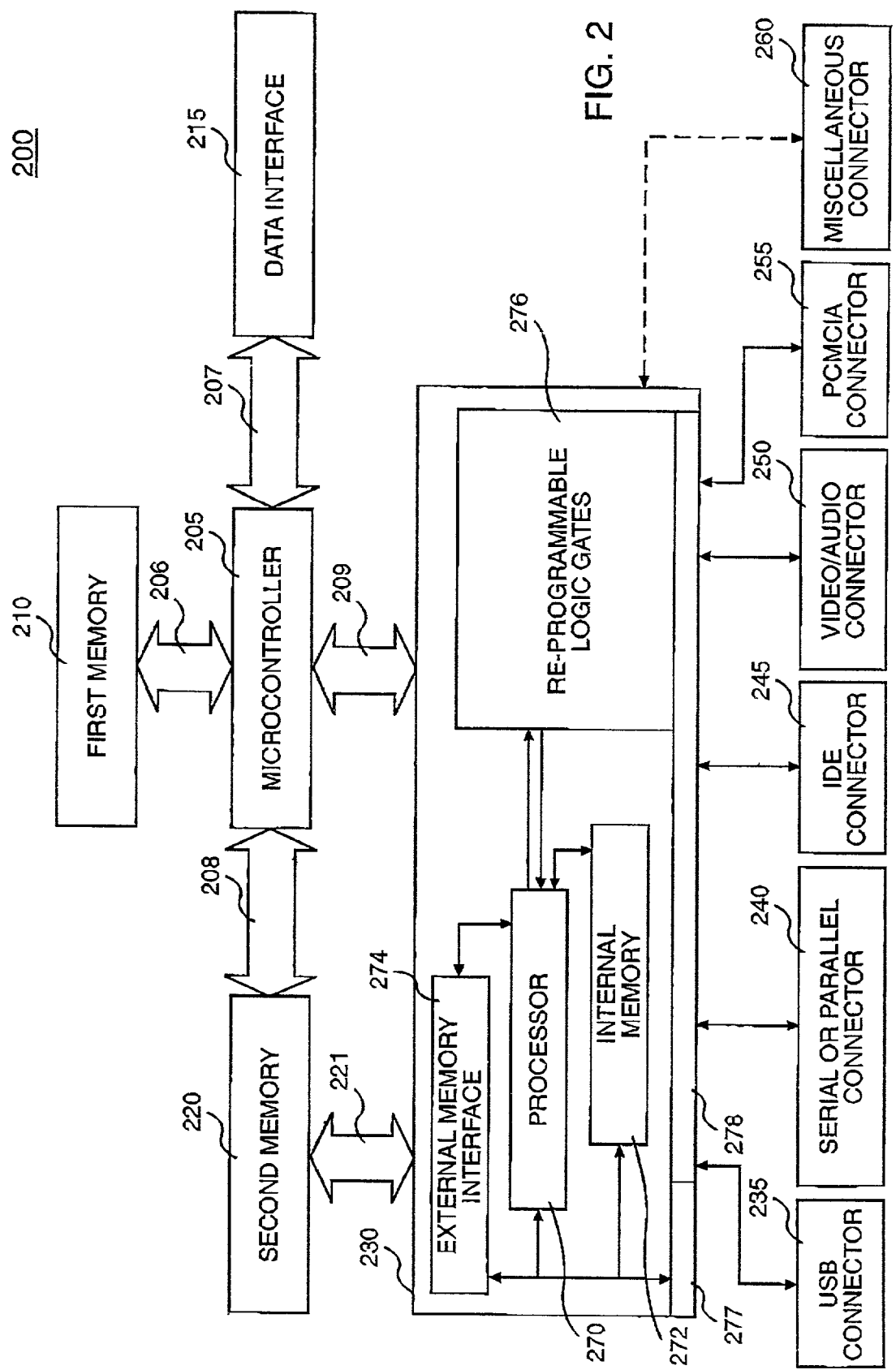
FIG. 2 shows a circuit block diagram of the reconfigurable communication interface in FIG. 1.

With reference now to FIG. 2 a circuit implementation of a RCI 200 will now be described. It will be understood by one skilled in the art that, the functional elements described earlier with reference to FIG. 1 may be embodied in one or more of the circuit elements in FIG. 2, and that some of the functional elements in FIG. 1 may embody one or more of the circuit elements in FIG. 2.

The RCI 200 comprises a microcontroller 205 which is connected by: a communication bus 206 to a first memory 210; a communication bus 207 to a data interface 215; a communication bus 208 to a second memory 220; and a communication bus 209 to a programmable logic device (PLD) 230. In addition, the second memory 220 is connected by a communication bus 221 to the PLD 230, and the PLD 230 has a number of input/output (I/O) ports, collectively labeled 278. Each of the I/O ports 278 is connected to one of a variety of connectors 235–260. These connectors include a USB connector 235, a serial or parallel connector 240, an IDE connector 245, a video/audio connector 250, such as part number SG318-3 manufactured by SourceGate, a PCMCIA connector 255, and a miscellaneous connector 260, which may be a user selectable connector 260 by a plug-in connector adapter.

The microcontroller 205 is a primary processing unit, which runs on an embedded operating system (OS) known as Monta-Vista's Hard Hat Linux, which executes a variety of programs. The programs include an initialization program, a main program and a power down program, each of which win be described in more detail later.

The micro-controller 205 comprises an eight-bit processor with eight kilobytes of working integrated memory. An example is the MP80C51 by Intel Corporation. However, any functional equivalent may be employed. It should be noted that if the RC 200 is to be used as a portable device, then a equivalent processor should at least meet similar power consumption specifications as the part made by Intel Corporation mentioned above.

The first memory 210 is a flash erasable read-only-memory (ROM) with a capacity. of four megabytes. An example is part no. SST39VF200-55-4C-WH, manufactured by SST. The first memory 210 is used primarily for storing the OS, the programs, i.e. initilization program, main program, and power down program; connector cores, device drivers, and applications. The function of the connector cores, device drivers, and applications, are as was described earlier.

The second memory 220 provides the working memory space for the microcontroller 205, and perhaps even for the programmable hi logic device 230. An example of a product that might be used is part no. MT48LC2M32B2TG having 8 megabytes of memory, which is manufactured by Micron.

The data interface 215 is for communicating with the microcontroller 205 and for loading software directly into the RCI 200. Such software can include updates to the operating system, programs, connector cores, device drivers and applications. A known serial interface, such as RS232 or parallel data connectors, can be used.

An example of a part that can be used as the PLD 230 is part no. XL-2002 manufactured by Xilinx. The PLD 230 includes a processor 270, internal memory 272 having ROM and RAM, an external memory interface 274 for communicating with the second memory 220, reprogrammable logic gates 276, a JTAG port 277, and I/O ports 278, which are connected to the connectors 235–260. The processor 270 is a 16-bit reduced instruction set computer (RISC) which runs at 200 MHZ. The PLD 230 receives connector cores and device drivers from the first controller 205 and configures the reprogrammable logic gates 276 to provide connector processors for communication with a variety external devices, as was described earlier. The programmable logic array, or a field programmable gate away may be used as the PLD 230.

The JTAG port 277 is used to access the internal programming registers of the PLD 230 and allows the PLD 230 to be programmed, and also to monitor the operation of the PLD 230. The JTAG 277 is normally used during development, and may be used for testing, troubleshooting and updating purposes on the PLD 230.

Figure 3:
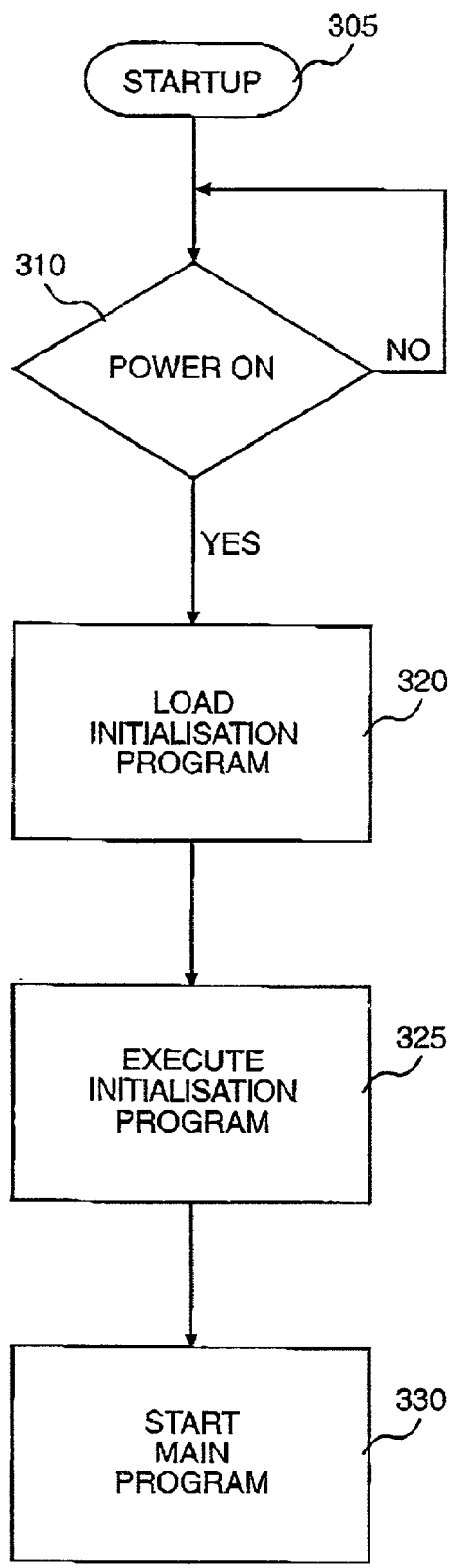
FIG. 3 shows a flow chart detailing an initialization process of the reconfigurable communication interface in FIG. 2.

With additional reference now to FIG. 3, an initialization process of the RCI 200 will now be described. The process starts 305, when power in the RCI 200 is switched ON 310. The microcontroller 205 then fetches a startup code, or what has been referred to here as the initialization program, from the first memory 210 and loads 320 the initialization program into its memory i.e. the memory of the microcontroller 205. The microcontroller 205 then executes 325 the initialization program which provides the basic instruction set for the initializing operation of the RCI 200. The initialization program contains instructions for the microcontroller 205 to initialize the second memory 220, initialize the PLD 230, and exceptionally, detect the hardware status of the I/O ports 278. The hardware status of the I/O ports 278 allows the microcontroller 205 to determine which of the I/O ports 278 are active, thus indicating that an external device is connected to one of the connectors 235–260, and that a corresponding connector core is required.

Upon successful initialization of the secondary memory 220 and the PLD 230, the microcontroller 205 downloads the OS, the main program and the power down program from the first memory 210 to the second memory 220. The microcontroller 205 then reconfigures the PLD 230 with the required connected core as detected above, and starts 330 the main program of the RCI 100, and passes control over to the main program.

Figure 4:
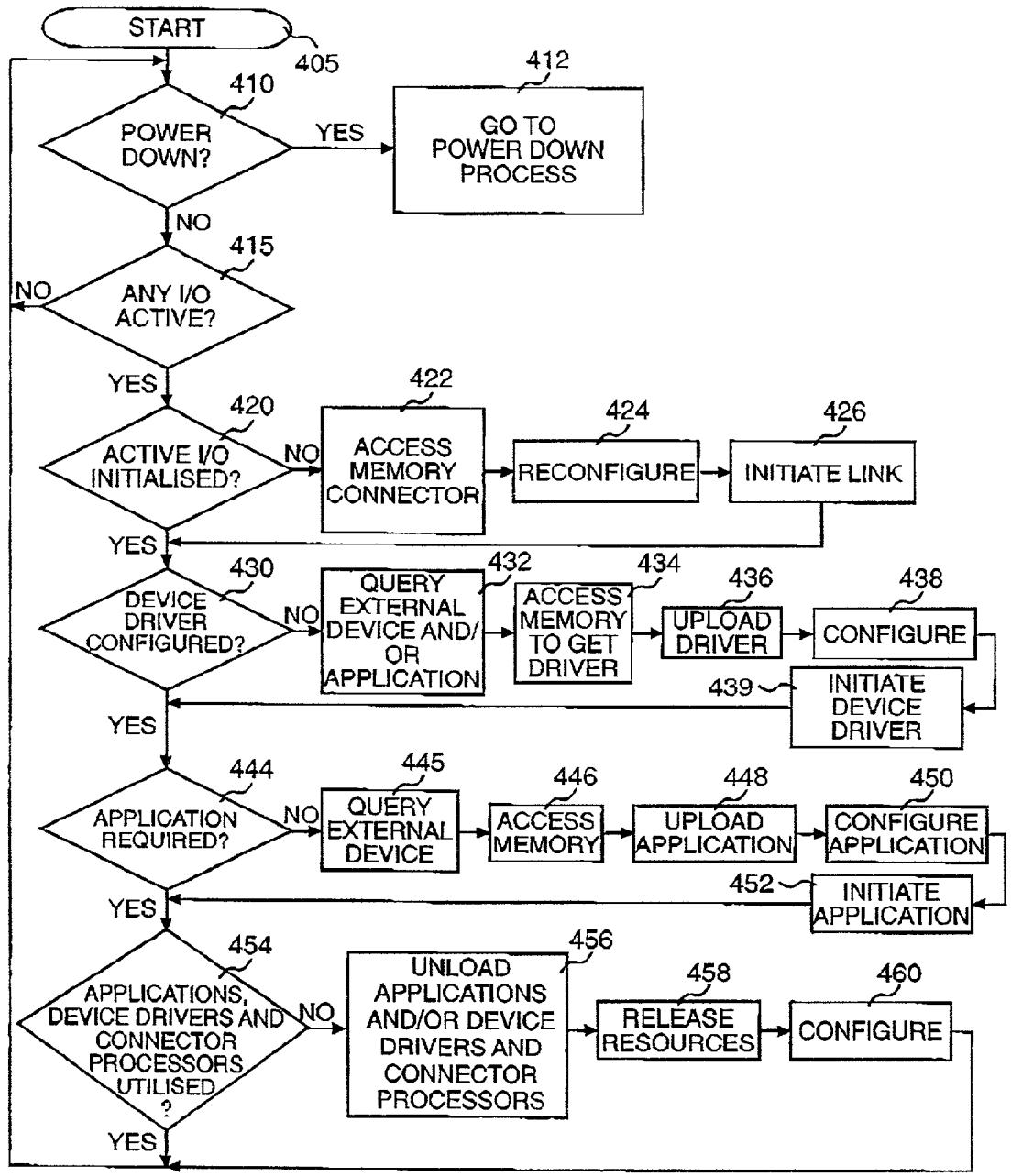
FIG. 4 shows a flow chart detailing operation of a main process of the reconfigurable communication interface in FIG. 2.

Now with additional reference to FIG. 4, a main process of the RCI 200 will be described. The main process starts 405 when the main program gets control from the initialization program. The microcontroller 205 then checks 410 whether a power down process has been initiated. The power down process involves the microcontroller 205 executing the power down program, and the microcontroller 205 will thereby be able to determine whether the power down program has been initiated.

The power down process begins, for example, when a user switches the RCI 200 OFF. If the power down process has been initiated, then control switches 412 from the main program to the power down program. However, when the microcontroller 205 determines that the power down process has not been initiated, then a determination 415 is made as to whether any of the I/O ports 278 has become active. This is will indicate to the microcontroller 205 whether any of a variety of external devices, have been connected to any of the connectors 235–260. If none of the I/O ports 278 are active, then the process returns to step 410.

Determining whether any of the I/O ports 278 are active can be accomplished in a number of ways including by polling i.e. periodically checking each of the I/O ports 278, or by interrupts where the microcontroller 205 has interrupt input links coupled to each of the I/O ports 278. Then, when one of the I/O ports 278 receives a signal, as when an external device is connected to one of the connectors 235–260, that particular I/O port will cause its interrupt line to provide an indication to the microcontroller 205 that the particular I/O port associated with that particular interrupt needs attention.

We can also detect whether a particular I/O port is active by detecting the status of one or more signals. As an example, consider a USB host or master I/O port 235 on the RCI 200, which has four signal lines. These lines are: VCC, which is 5 volts DC (direct current) in all states; a D+ line which is 0 volts DC when the port is not active; a D– line which is 0 volts DC when the port is not active; and a ground line at 0 volts DC. When a high speed USB slave external device is connected to the USB host port, the D+ line goes from 0 volts DC to 3.3 volts DC. This change can be detected by the microcontroller 205, which would go through a process of verification and initialization until communication with the external USB device has been established. This process is performed while the D– line remains at 0 volts DC.

Now, when a low speed USB slave device connects to the USB host I/O port on the RCI 200, the D+ line remains at 0 volts DC, however, the D– line goes from 0 volts DC to 3.3 volts DC. This change indicates to the microcontroller 205 that the USB host I/O port is active and that a low speed USB device has been connected to that port After detecting an I/O port is active, a determination 420 as to whether the active I/O port has been initialized is made by the microcontoller 205. The mcrocontroller 205 accomplishes this by attempting to communicate with the connected external device. If the I/O port has not been initialized, no communication with the connected external device is possible. The microcontroller 205 then determines that the active I/O port is not initialized, and accesses 422 the first memory 210 to locate an appropriate connector core associated with the active port. When an appropriate connector core is located, the microcontroller 205 downloads the connector core to the PLD 230. The PLD 230 then uses the connector core to configure 424 or reconfigure some of the logic gates 276 to provide a connector processor that can initialize the active I/O port. The first microcontroller 205 then initiates 426 a link with the.external device connected to the active I/O port, and after receiving responses from the external device, confirms that the active I/O port has been initialized.

Considering again the example above of the high speed USB slave external device and the USB host I/O port on the RCI 200, upon detecting the D+ line changing from 0 volts to 3.3 volts DC, i.e. going from logic state 0 to logic state 1, the microcontroller 205 sends a command requesting for new device descriptions to be sent to a generic address line, say 00. The high speed USB slave external device responds by sending a package of data containing its name and characteristics to the microcontroller 205 via the USB host I/O port. The rnicrocontroller 205 then confirms that the USB host I/O port is activated by a newly connected USB client i.e. the high speed USB slave external device, and that the detection was not caused by some electrical noise.

Next, the microcontroller 205 creates a specific address for the high speed USB slave external device, activates the specific address and sends the address to the high speed USB slave external device. When the high speed USB slave external device receives the specific address, the high speed USB slave external device will know that upon receipt the specific address is assigned to it, and the high speed USB slave external device will then only respond to commands from the microcontroller 205 that are sent to the specific address.

The microcontroller 205 then sends a command requesting a device descriptor again, but this time the command is sent to the specific address. The high speed USB slave external device receives the request and replies with a device descriptor package via the specific address When the microcontroller 205 receives the second device descriptor from the specific address, this provides confirmation to the microcontroller 205 that the high speed USB slave external device is hosted by the RCI 200, and that a link is established between the high speed USB slave external device and the USB host 110 port on the RCI 200 at the particular connector with the specific address. The microcontroller 205 then continues with additional communication with the high speed USB slave external device to setup the I/O port specifically to the needs and characteristics of the high speed USB slave external device, including identifying and loading required device drivers and applications. After this is done, the RCI 200, as a host, can transfer control to a required application program, which will use the newly established communication with the external device to exchange services.

For audio and video data through a normal analog connector, the process is less complex. Activation occurs when a user physically connects a matching connector to the connector 250 on the RCI 200. Through a user input on the RCI 200, the user then provides an indication that an audio or video service is required. The microcontroller 205 under the control of the main program associates the requested audio/video service with the connector 250 and corresponding port 278, and sets up the port 278 accordingly.

Next, the microcontroller 205 determines 430 whether a device driver associated with the external device connected to the active port has been configured in the PLD 230. If there is, then the device driver and the connector processor, configured earlier, establish communication with the external device through the active port.

Alternatively, the required device driver may not be configured in the PLD 230. Then, the microcontroller 205 queries 432 the external device using the configured connector processor to determine which external device is connected. The external device typically responds to the query by indicating the device driver that will be required to communicate with it, and other device specific information, such as slave or master status relative to the RCI 200 and any applications that are required by the external device.

Instead of querying the eternal device, as described above, the microcontroller 205 can utilize information received from the external device, such as the device descriptors, during communications prior to step 432. For example, information received from the external device when the active I/O port was initialized in step 426 or thereafter, can provide indications of the device drivers and even applications that will be required by the external device.

The microcontroller 205 then accesses 434 the first memory 210 to locate a device driver associated with the external device, and provides 436 the device driver to the PLD 230, which then configures a corresponding device driver which, together with the earlier configured connector processor, can communicate with the external device through the active port, after the device driver has been initialized 439.

The miicrocontroller 205 then determines 444, from the response to the query in step 432, whether the external device had indicated requirements for applications and if so, are the required applications loaded in the second memory 220. If the required applications are loaded in the second memory 220, then the process moves on to step 454 However, if step 432 indicates that an application is required, then the microcontroller 205 can query 445 the external device to determine the required applications The microcontroller 205 then accesses 446 the first memory 210 to locate the required application, uploads 442 the required application into the second memory 220, and initiates 443 the loaded application. The application then operates with the device drivers and connector processors, previously configured, to communicate with the external device and support the services required by the external device.

Usually, the external device does not request applications that it requires, rather the external device indicates what it can do in terms of the services it can offer to devices that are connected to the host, i.e. the RCI 200. The RCI 200 associates the services to specific applications, and in this way the host loads the specific applications into the second memory 220 and initializes those applications. The external devices are then ready to serve any request from another device hosted by the RCI 200.

The microcontroller 205 monitors 454 the applications in the second memory 220 and the device drivers and connector processors configured in the PLD 230, and any other loaded applications and device drivers and connector processors that may have been previously configured therein, to determine whether any of the applications and/or device drivers and connector processors are not being utilized. If any of the applications and/or device drivers and connector processors are no longer being utilized, those applications, and/or device drivers and connector processors, are unloaded 456 from the PLD 230, and the associated resources in the second memory 220 and PLD 230 are released 458 by the microcontroller 205. Thus, making those resources available to support any future external device connections. At this point, the microcontroller 205 gains access to the released resources and reconfigures 460 the released resources accordingly for subsequent reconfiguration.

In addition, when the microcontroller 205, running the main program, detects that an active I/O port 278 is no longer active, the microcontroller 205 unloads any application, and device drivers and connector processors associated with the I/O port 278 which is no longer active.

Figure 5:
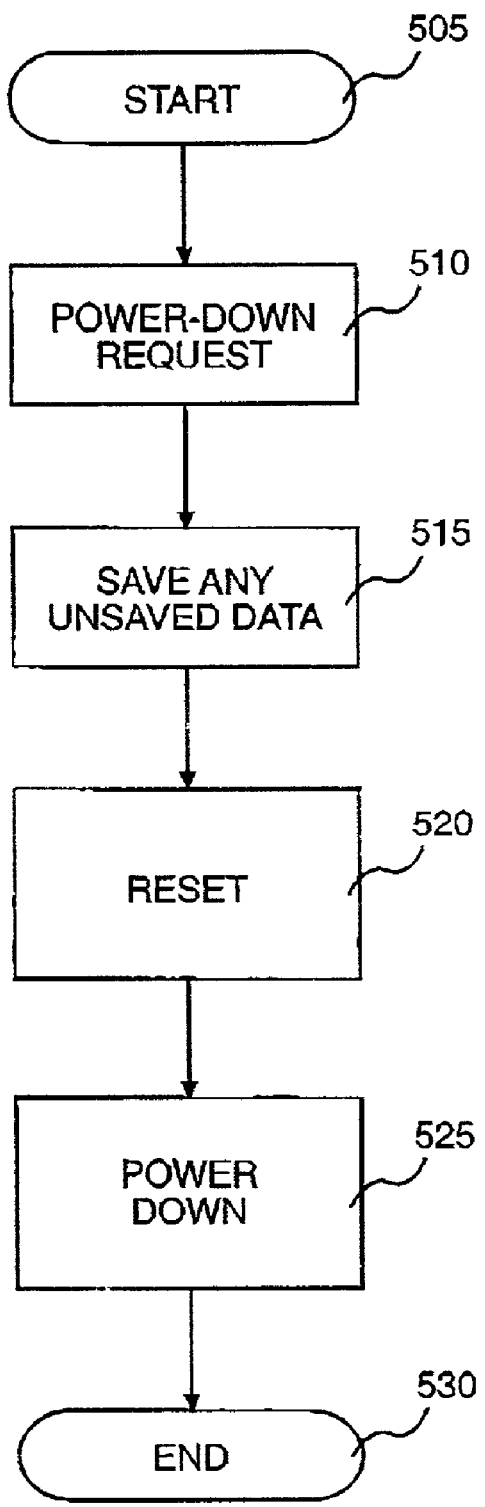
FIG. 5 shows a flow chart detailing operation of a shutdown process of the reconfigurable communication interface in FIG. 2.

With reference to FIG. 5, the power down process starts 505 with a power down request being received 510 by the microcontroller 205. In response to receiving the request, the microcontroller 205 saves 515 any unsaved data to the first memory 210 or any such external memory device that is connected to the RCI 200 and configured to provide storage on power down. The power down request is detected when the microcontroller 205 and/or the PLD 230 detects an interrupt signal from the power OFF indicating switch or a request from an application running in master mode and controlling the RCI 200. Alternatively a maximum idle time condition may have been reached. Yet another alternative, is the microcontroller 205 receiving an indication from a user operable input to switch the RCI 200 OFF. After saving any unsaved data, the microcontroller 205 is reset 520 and the power turned OFF 525 marking the end 530 of the power down process and turning OFF the RCI 200.

A person skilled in the art will appreciate that user inputs and even a user display can be incorporated to the RCI 200 to provide a user interface. Such an interface can be used, along with other know user functions, to allow a user to select the direction in which information is to flow i.e. into the RCI 200, from the RCI 200 or through the RCI 200. The selection will of course depend on the application to which the RCI 200 is applied. For example, when the RCI 200 has a hard disk drive as the second memory 220, the user can use the RCI 200 as a means of transferring or transporting information between a variety of equipment. In addition, when one of the connectors 235–260 is connected to provide Internet access, the RCI can be used to transfer user-selected information to a pre-configured website for direct storage and subsequent retrieval, and/or data synchronization, without the need for any additional equipment. In this way, personal information storage can be managed with a significant degree of flexibility, and at the same time alleviating some of the problems of the prior art.

The present invention, as described, provides a reconfigurable communication interface that can be used in conjunction with a mass storage media to provide a solution for storing personal information that can be made portable and conveniently connected to a variety of devices through a variety of connectors without the need for user selection of communication protocols and the like.

This is accomplished by providing a reconfigurable communication interface having a variety of connectors and reconfigurable processing resources. When an external device is connected to one of the connectors, the connector and the device are detected, and communication exchanged with the external device Based on the communication with the external device, the reconfigurable processing resources are configured to support communication with the external device via the connector, and when another external device and another connector are connected to the reconfigurable communication interface, the processing resources are reconfigured to support communication with the other external device through the other connector.

The present invention seeks to provide a reconfigurable communication interface and a method therefor, which overcomes, or at least reduces the abovementioned problems of the prior art It will be appreciated that although only one particular embodiment of the invention has been described in detail, various modifications and improvements can be made by a person skilled in the art without departing from the scope of the present invention.

What is claimed is:

1. An electronic apparatus for operably coupling to at least a first device of a variety of devices having at least one connector thereon, the apparatus comprising:
   a variety of connectors, wherein the variety of connectors include a first connector that connects to the at least one connector;
   a programmable coupler having an input for receiving coupling instructions and having communication ports coupled to the variety of connectors, wherein at least one of the communication ports is coupled to the first connector, the programmable coupler for coupling the at least one communication port in accordance with the coupling instructions;
   a controller coupled to the programmable coupler, the controller for determining that the first device is connected to the first connector, and for providing the coupling instructions, the controller for accessing a first device driver of a variety of device drivers, and accessing a first connector core of a variety of connector cores, and the controller being coupled to provide the first device driver and the first connector core; and a programmable logic unit coupled to the controller and the programmable coupler, and the programmable logic unit having a variety of logic resources, the programmable logic unit for receiving the first device driver and the first connector core, for configuring at least some of the variety of logic resources in accordance with the first connector core to provide a first connector processor and first device driver and the, and for configuring the first device driver to operate with the connector processor, wherein the first device driver and the first connector processor establish communication with the first device via the programmable coupler.

2. An electronic apparatus in accordance with claim 1, further comprising:

a memory having at least another connector thereon, wherein the variety of connectors include a second connector that couples to the at least another connector, the memory having at least a device driver portion and a connector core portion.

3. An electronic apparatus in accordance with claim 2 wherein the memory comprises a semiconductor memory.

4. An electronic apparatus in accordance with claim 3 wherein the semiconductor memory comprises one or more random access memory, dynamic random access memory, read only memory, programmable read only memory.

5. An electronic apparatus in accordance with claim 2 wherein the memory comprises a magnetic memory.

6. An electronic apparatus in accordance with claim 5 wherein the magnetic memory comprises a hard disk drive.

7. An electronic apparatus in accordance with claim 6 wherein second connector and the at least another connector comprises matching IDE connectors.

8. An electronic apparatus in accordance with claim 2 wherein the memory comprises optical memory.

9. An electronic apparatus in accordance with claim 8 wherein the optical memory comprises a read/write optical disk drive.

10. An electronic apparatus in accordance with claim 1 wherein the controller comprises at least one microprocessor.

11. An electronic apparatus in accordance with claim 10 wherein the controller comprises at least one memory coupled to the at least one microprocessor.

12. An electronic apparatus in accordance with claim 11 wherein the at least one memory includes at least a device driver portion and a connector core portion.

13. An electronic apparatus in accordance with claim 1 wherein the programmable coupler comprises at least another programmable logic unit.

14. An electronic apparatus in accordance with claim 1 wherein the programnmable coupler comprises at least one matrix switching device.

15. An electronic apparatus in accordance with claim 1 wherein the programmable coupler comprises at least one multiplexer.

16. An electronic apparatus in accordance with claim 1 wherein the programmable logic unit comprises a programmable logic device, a programmable logic array, or a field programmable gate array.

17. An electronic apparatus in accordance with claim 1 wherein the variety of connectors comprise a plurality of at least one of the variety of connectors.

18. An electronic apparatus in accordance with claim 1 wherein the variety of connectors includes one or more of the following connectors: an IDE connector, a USB connector, an audio connector, a video connector, a serial connector, a parallel connector, a Firewire connector, a PCI connector and a PCMCIA connector.

19. An electronic apparatus in accordance with claim 18 wherein the first memory further comprises an application portion for storing a variety of application programs that operate with at least some of the variety of device drivers and some of the variety of connector cores to support the exchange of services with at least some of the variety of devices.

20. An electronic apparatus for operably coupling to at least a first device of a variety of devices having at least one connector thereon, the apparatus comprising:

a variety of connectors, wherein the variety of connectors include a first connector that physically connects to the at least one connector;

a first memory having a device driver portion for storing a variety of device drivers and having a connector core portion for storing a variety of connector cores;

a programmable logic device having communication ports coupled to the variety of connectors; and a controller coupled to the first memory and the programmable logic device, the controller for communicating with the programmable logic device to determine the first device is connected to the first connector, and the controller for providing at least a first device driver of the variety of device drivers and at least a first connector core of the variety of connector cores from the first memory to the programmable logic device, wherein the programmable logic device configures a corresponding connector processor therein and configures a corresponding device driver to operate with the connector processor, and wherein the corresponding device driver and the corresponding connector processor establish communication with the first device through the first connector.

21. An electronic apparatus in accordance with claim 20 wherein the first memory further comprises an operating system portion and a program portion.

22. An electronic apparatus in accordance with claim 21 wherein the program portion includes a main program portion, an initialization program portion and a power down program portion.

23. An electronic apparatus in accordance with claim 20 further comprising a second memory coupled to the controller and coupled to the programmable logic device, the second memory for providing working storage for the controller and/or the programmable logic device.

24. An electronic apparatus in accordance with claim 23 wherein the second memory includes at least a flash memory, a static random access memory (SRAM), or a dynamic access memory (DRAM).

25. An electronic apparatus in accordance with claim 20 wherein the controller comprises a microcontroller.

26. An electronic apparatus in accordance with claim 20 wherein the first memory comprises at least a flash erasable read-only-memory.

27. An electronic apparatus in accordance with claim 20 wherein the programmable logic unit comprises at least a programmable logic array, or a field programmable gate array.

28. An electronic apparatus in accordance with claim 20 wherein the variety of connectors include one or more of the following connectors: an IDE connector, a USB connector, an audio connector, a video connector, a serial connector, a parallel connector, a Firewire connector, a PCI connector and a PCMCIA connector.

29. A method in a reconfigurable communication interface for operably coupling to a first device of a variety of devices, the first device having at least one connector thereon, the method comprising the steps of:
   a) providing the reconfigurable communication interface comprising:
      a variety of connectors, wherein the variety of connectors include a first connector that connects to the at least one connector;
      a programmable logic device having a plurality of communication ports coupled to the variety of connectors; and
      a controller coupled to the programmable logic device;
   b) detecting the first device is physically connected to the fist connector;
   c) accessing a first connector core of a variety of connector cores associated with the first connector;
   d) configuring a first connector processor in the programmable logic device;
   e) accessing a first device driver of a variety of device drivers associated with the first device;
   f) configuring the first device to operate with the first connector processor in the programmable logic device; and
   g) establishing communication with the first device through the first connector using the first connector processor and the first device driver.

30. A method in accordance with claim 29 further comprising the steps of:
   h) providing a second device of the variety of devices, the second device having at least another connector thereon, and wherein the variety of connectors include a second connector that connects to the at least another connector;
   i) detecting the second device is physically connected to the second connector;
   j) accessing a second connector core of the variety of connector cores associated with the second connector;
   k) configuring the second connector processor in the programmable logic device;
   l) accessing a second device driver of the variety of device drivers associated with the second device;
   m) configuring the second device driver to operate with the second connector processor in the programmable logic device; and
   n) establishing communication with the second device through the second connector using the second connector processor and the second device driver.

31. A method in accordance with claim 30 further comprising the steps of:
   o) detecting the first device is physically disconnected from the first connector;
   p) unloading the first connector processor and the first device driver.

32. A method in accordance with claim 29 wherein step (b) comprises the step of detecting whether a first communication port of the plurality of communication ports, which is coupled to the first connector, is active.

33. A method in accordance with claim 32 wherein detecting whether the first communication port is active comprises detecting the status of one or more signals associated with the first communication port.

* * * * *

UNITED STATES PATENT AND TRADEMARK OFFICE
CERTIFICATE OF CORRECTION

PATENT NO.          : 6,973,658 B2                                    Page 1 of 1
APPLICATION NO.     : 09/934618
DATED               : December 6, 2005
INVENTOR(S)         : Michael Anh Nguyen It is certified that error appears in the above-identified patent and that said Letters Patent is hereby corrected as shown below:

Title page, Item (30) Priority information was omitted from the patent. Please add priority information --Singapore application, Serial No. 200004835-5, filed August 25, 2000--

Signed and Sealed this

Twelfth Day of December, 2006

JON W. DUDAS
*Director of the United States Patent and Trademark Office*